United States Patent [19]

Kurihara

[11] Patent Number: 4,783,260

[45] Date of Patent: Nov. 8, 1988

[54] FILTER DEVICE IN A FUEL TANK HAVING ANGULARLY ORIENTED SUCTION PORT, AND INTEGRAL SPACERS

[75] Inventor: Kazumasa Kurihara, Yokohama, Japan

[73] Assignee: Nifco, Inc., Yokohama, Japan

[21] Appl. No.: 80,832

[22] Filed: Aug. 3, 1987

[30] Foreign Application Priority Data

Aug. 1, 1986 [JP] Japan .................... 61-117512[U]

[51] Int. Cl.⁴ ............................................. B01D 35/02
[52] U.S. Cl. ...................... 210/232; 210/314;
210/316; 210/441; 210/416.4
[58] Field of Search .............. 210/171, 172, 416.4,
210/460, 486, 441, 167, 232, 314, 316; 55/306

[56] References Cited

U.S. PATENT DOCUMENTS 3,276,596 10/1966 Gran et al. ...................... 210/172
4,312,753 1/1982 Bell .............................. 210/416.4 X
4,684,463 8/1987 Mizusawa ..................... 210/416.4 X Primary Examiner—Richard V. Fisher
Assistant Examiner—Wanda L. Millard
Attorney, Agent, or Firm—Schwartz & Weinrieb

[57] ABSTRACT

A filter device for a fuel tank includes a suction pump main body contained within a fuel tank, a generally cylindrical mounting member mounted upon a bottom portion of the pump main body, and a filter attached to the bottom portion of the pump main body through means of the mounting member. The filter comprises a net. The net is folded over upon itself such that an upper net piece and a lower net piece are vertically overlapped with respect to each other. The upper net piece is formed with a through hole for permitting an upper portion of the mounting member to pass therethrough. The peripheral portions of the net pieces are welded to each other so that the filter is formed as a flat, bag-shaped structure defining an inner enclosed space. The upper portion of the mounting member is connected with the bottom portion of the pump main after passing through the through hole. The inner enclosed space of the filter is in fluid communication with the pump main body by means of the mounting member.

20 Claims, 2 Drawing Sheets

FILTER DEVICE IN A FUEL TANK HAVING ANGULARLY ORIENTED SUCTION PORT, AND INTEGRAL SPACERS

BACKGROUND OF THE INVENTION

1. Field of the Invention

This invention relates to a filter device which is disposed within a fuel tank such as a gasoline tank of an automobile.

2. Description of the Prior Art

A gasoline tank of an automobile is usually provided with a filter attached to the leading end of a suction pipe in order to prevent intake of impurities.

One conventional filter comprises a basket-shaped frame and a metallic net attached to the frame. Another conventional filter comprises a synthetic resin net instead of a metallic net, and likewise a synthetic resin frame integrally molded together with the net. At present, the latter type is used for the most part, in view of cost, manufacturing ease, and the like. Specific examples thereof are disclosed, for example, in Japanese Utility Model Publication Nos. SHO 52-37915, SHO 53-42840, and SHO 55-55784.

As described in the respective publications, these synthetic resin filters are superior to the metallic filters in respect of manufacturing ease, and the like. However, they have a shortcoming in that, because of their structure, the position at which fuel can be sucked in is relatively high. Therefore, it sometimes happens that fuel cannot be drawn in from the gasoline tank even though a considerable amount of fuel remains in the tank.

Furthermore, in recently designed automobile fuel tanks, the main body of the suction pump is disposed within the tank and the main body of the pump is provided with a filter. In this case, there arises the problem that the height of the filter makes it difficult to mount the pump main body and the conventional type of a filter becomes practically impossible to use.

OBJECTS

The present invention was accomplished in view of the above-mentioned problems inherent in the prior art. It is therefore an object of the present invention to provide a filter device which can effectively withdraw fuel from a tank and leave only a minimal amount of fuel remaining in the tank.

Another object of the invention is to provide a filter device which is easy and inexpensive to manufacture.

SUMMARY OF THE INVENTION

In order to achieve the above objects, there is essentially provided a filter device for a fuel tank comprising a suction pump main body contained within a fuel tank, a generally cylindrical mounting member mounted upon a bottom portion of the pump main body, and a filter attached to the bottom portion of the pump body through means of the mounting member, the filter comprising a net, the net being folded over upon itself such that an upper net piece and a lower net piece are vertically overlapping with respect to each other, the upper net piece being formed with a through hole for permitting an upper portion of the mounting member to enter therethrough so as to face the lower net piece, the peripheral portions of the net pieces being welded to each other so that the filter is formed as a flat, bag-shaped structure defining an inner enclosed space, the upper portion of the mounting member being connected with the bottom portion of the pump main body after the mounting member has entered the filter device through the through hole, and the inner enclosed sapce of the filter being in fluidic communication with the pump main body by means of the mounting member.

The above-mentioned filter device of the present invention is mounted upon the bottom portion of the suction pump main body by means of the mounting member and contained within the fuel tank. Since the filter itself is a flat, bag-shaped structure comprising a net which is folded over upon itself such that an upper net piece and a lower net piece are vertically overlapped with respect to each other, it does not occupy much space in the vertical direction. Accordingly, the pump main body can be easily mounted within the tank. In addition, a suction port of the mounting member which facilitates withdrawal of the fuel from the fuel tank, can approach the bottom portion of the fuel tank. Accordingly, fuel can be effectively sucked from the fuel tank and the remaining amount of fuel can be reduced to a minimum.

BRIEF DESCRIPTION OF THE DRAWINGS

The above and other objects and features of the invention will become more apparent from the following detailed description with reference to the accompanying drawings wherein.

DETAILED DESCRIPTION OF THE PREFERRED EMBODIMENT

Figure 1:
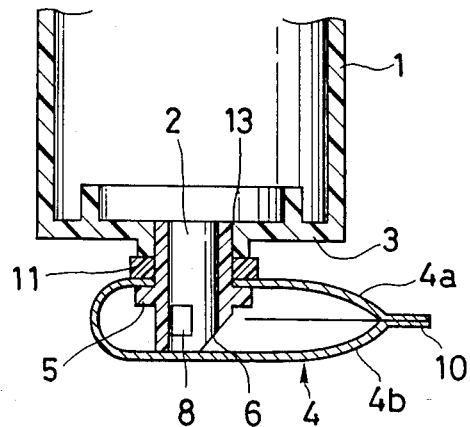
FIG. 1 is a vertical sectional view taken along the center of an important portion of a filter device according to one embodiment of the present invention.
Figure 2:
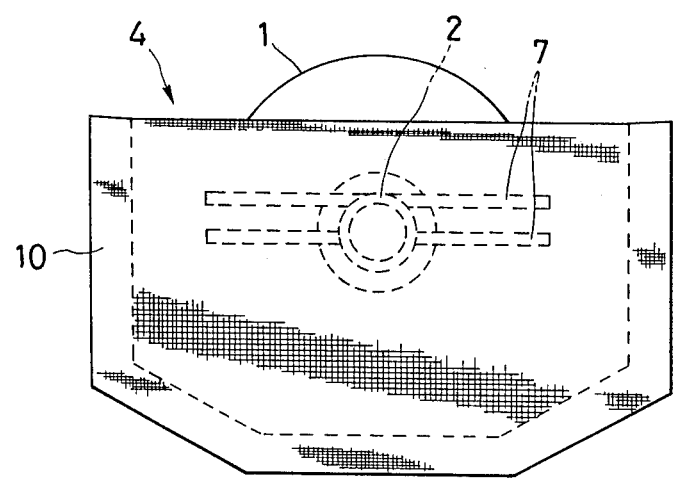
FIG. 2 is an enlarged bottom view of the filter device of FIG. 1.
Figure 3:
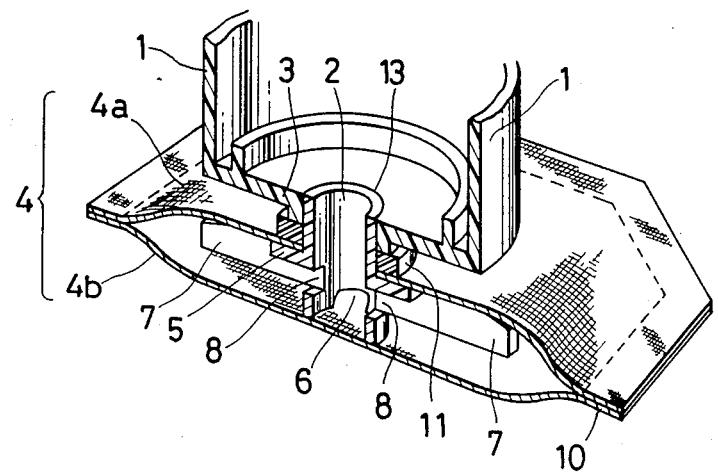
FIG. 3 is a perspective view of a vertical section taken along the center of an important portion of the filter device of FIG. 1.
Figure 4:
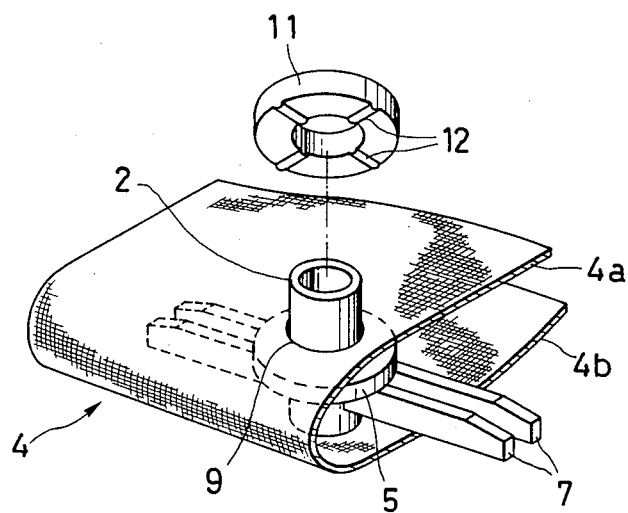
FIG. 4 is an exploded perspective view, partly cut away, of an important portion of the filter device of FIG. 1.

The drawings illustrate one preferred embodiment of the present invention. In the drawings, reference numeral 1 denotes a suction pump main body, numeral 2 a mounting member mounted on the bottom portion 3 of the pump main body 1, and numeral 4 a filter mounted by means of the mounting member 2.

The illustrated mounting member 2 is a short cylindrical body, which is integrally formed upon the outer periphery thereof with an annular flange 5. The mounting member 2 is formed at its lower end with an opening portion, a part of which is cut at an angle and is laterally opened as denoted by reference character 6. There is provided a pair of arms or frames 7 extending in the horizontal direction in such a manner as to hold the opening portion therebetween and to space the filter net pieces. The outer peripheral portion from where the pair of frames extend is formed with a second opening 8.

The filter 4 comprises a net which is folded over upon itself such that an upper net piece 4a and a lower net piece 4b are substantially vertically overlapped with respect to each other. The upper net piece 4a is formed in the generally central portion thereof with a through hole 9 for permitting the mounting member 2 to be passed therethrough. The peripheral portions 10 of the upper and the lower net pieces are welded to each other by means of heat, so that the filter 4 is formed into a bag-shaped structure. Before the filter 4 is formed into a bag-shaped structure, the mounting member 2 is passed through the through hole 9 and the main body portion, including the frames 7, is enclosed within the filter 4. The cylindrical portion of the mounting portion projecting from the upper surface of the net piece 4a has a ring-shaped retaining member 11 fitted thereon. The peripheral edge of the through hole 9 is held and secured between the retaining member 11 and the flange 5.

The inner diameter of the retaining member 11 is generally equal to the outer diameter of the cylindrical portion of the mounting member 2, so that the retaining member 11 can be secured to the cylindrical portion simply by fitting the same thereon. In addition, the retaining member 11 is provided on the lower surface thereof with a plurality of ribs or projections 12 which push against and bite into the upper surface of the net piece 4a so that the security between the mounting member 2 and the filter 4 is enhanced.

In this way, after the mounting member 2 has been mounted on the filter 4, the cylindrical portion at the upper end of the mounting member 2 is fitted in an opening portion 13 formed in the bottom portion 3 of the pump main body so as to complete the assembly.

The filter 4, which is formed into a bag-shaped structure by welding together peripheral portions 10 of the net pieces, maintains a horizontally stretched, flat-shaped bag configuration due to the rigidity of its material. In this embodiment, however, the frames 7 extending in the horizontal direction ensure a space between the upper and lower net pieces 4a and 4b within the filter 4 so as to maintain its ability to pass fuel. In addition, the provision of the frames 7 makes it possible for the lateral opening 6 and the second opening 8 to be open within the filter 4.

The filter device of the above-mentioned construction is disposed within a fuel tank (not shown) together with the suction pump main body 1 and the flat bag-shaped filter 4 disposed along the upper surface of a bottom plate of the tank, and the lateral opening of the mounting member 2 is disposed adjacent to the upper surface of the bottom plate.

As described in the foregoing, the filter device according to the present invention has a filter formed in a flat bag-shaped structure. Accordingly, the filter device can be disposed along the upper surface of the bottom plate of the fuel tank. In addition, since the lateral opening of the mounting member serving as a suction port for fuel can be disposed adjacent to the upper surface of the bottom plate, the fuel within the tank can be effectively withdrawn, and the remaining amount of fuel can be minimized.

If the lateral opening of the mounting member should abut against the bottom plate of the tank upon mounting of the filter, since the opening is inclined as described, it is not blocked. Accordingly, the suction of fuel is always stable.

Furthermore, since the filter is flat and does not occupy much space in the direction of its height, the invention has the advantage that little restrictions are placed upon mounting of the suction pump main body within the tank.

On the other hand, the filter device according to the present invention can be simply manufactured by forming the mounting member as an integrally molded product of a synthetic resin and combining this member with the net. Accordingly, the filter device of the present invention is superior in manufacturability to the conventional filter which comprises a basket type frame with a net stretched therearound.

Furthermore, although the mounting member and the filter are joined together, the filter device according to the present invention is not rigidly formed as a whole. Accordingly, the filter device according to the present invention has much adaptability. Because of the foregoing, even if a part of the filter abuts against the bottom surface, for example of the tank and is deformed, the function thereof is not substantially degraded. In addition, it is not adversely affected by external shock.

Obviously, many modifications and variations of the present invention are possible in light of the above teachings. It is therefore to be understood that within the scope of the appended claims, the present invention may be practiced otherwise than as specifically described herein.

What is claimed is:

1. A filter system for a fuel tank, comprising:
   suction pump means for disposition within a fuel tank;
   a mounting member having an upper end thereof mounted within a bottom portion of said suction pump means;
   a filter, attached to said mounting member, comprising a net defined by means of an upper net piece and a lower net piece which are vertically overlapped with respect to each other, said upper net piece being formed with a through hole for permitting said mounting member to enter therethrough and be disposed transverse to said upper and lower net pieces, the peripheral portions of said net pieces being sealed with respect to each other so that said filter is formed as a flat, bag-shaped structure defining an inner enclosed space which is in fluidic communication with said suction pump means by means of said mounting member; and
   a lowermost end portion of said mounting member having suction port means, defined within a first sidewall portion thereof inclined with respect to said lower net piece, such that when the remaining sidewall portions of said mounting member are in contact with said lower net piece, fuel may nevertheless be sucked from said fuel tank through said filter and said mounting member by said suction pump means.

2. A filter system as set forth in claim 1, wherein:
   said mounting member comprises a cylindrical tube.

3. A filter system as set forth in claim 1, further comprising:
   an annular flange formed upon an intermediate portion of said mounting member; and
   a retaining ring disposed about said mounting member for engagement with said annular flange of said mounting member for securing said through-hole portion of said upper net piece therebetween.

4. A filter system as set forth in claim 3, further comprising:
   rib means formed upon an undersurface of said retaining ring for enhancing the securement of said upper net piece with respect to said annular flange.

5. A filter system as set forth in claim 1, wherein:
   said upper and lower net pieces are intergrally formed together as a single net piece which is folded over upon itself so as to define said upper and lower net pieces.

6. A filter system as set forth in claim 1, wherein:

said peripheral portions of said upper and lower net pieces are welded to each other.

7. A filter system as set forth in claim 1, further comprising:
spacer means mounted upon a lower portion of said mounting member and disposed internally within said inner enclosed space of bag-shaped structure for maintaining spacial separation between said upper and lower net pieces.

8. A filter system as set forth in claim 1, wherein:
said spacer means comprises a pair of arms extending transversely with respect to said mounting member.

9. A filter system as set forth in claim 8, wherein:
said pair of arms extend parallel to each other.

10. A filter system for a fuel tank, comprising:
suction pump means for disposition within a fuel tank;
a mounting member having an upper and lower end thereof connected to a bottom portion of said suction pump means, and a suction port defined within a lower end thereof;
a filter, mounted upon said mounting member, defined by means of an upper net piece and a lower net piece which are vertically overlapped with respect to each other, said upper net piece and said lower net piece having peripheral portions thereof sealed with repsect to each other so as to define a flat, bag-shaped structure defining an inner enclosed space, said upper net piece being formed with a through-hole for permitting said lower end of said mounting member to pass therethrough with said suction port thereof disposed internally within said inner enclosed space so as to provide fluidic communication between said inner enclosed space and said suction pump means; and
spacer means mounted upon said lower end of said mounting member and disposed within said inner enclosed space so as to be interposed between said upper and lower net pieces for maintaining spacial separation between said upper and lower net pieces whereby fluid flow through said suction port of said mounting member is facilitated.

11. A filter system as set forth in claim 10, wherein:
said mounting member comprises a cylindrical tube.

12. A filter system as set forth in claim 11, wherein:
said tubular mounting member has a longitudinal axis; and
said suction port is disposed at an angle with respect to said longitudinal axis of said mounting member.

13. A filter system as set forth in claim 12, wherein:
said longitudinal axis of said tubular mounting member is disposed perpendicular to said lower net piece.

14. A filter system as set forth in claim 10, wherein:
said spacer means comprises a pair of arms extending transversely with respect to said mounting member.

15. A filter system as set forth in claim 14, wherein:
said pair of arms extend parallel to each other.

16. A filter system as set forth in claim 15, wherein:
said pair of arms extend outwardly from opposite sides of said mounting member so as to extend in a lengthwise direction of said filter net.

17. A filter system as set forth in claim 10, further comprising:
an annular flange formed upon an intermediate portion of said mounting member; and
a retaining ring disposed about said mounting member for engagement with said annular flange of said mounting member for securing said through-hole portion of said upper net piece therebetween.

18. A filter system as set forth in claim 17, further comprising:
rib means formed upon an undersurface of said retaining ring for enhancing the securement of said upper net piece with respect to said annular flange of said mounting member.

19. A filter system as set forth in claim 10, wherein:
said upper and lower net pieces are integrally formed together as a single net piece which is folded over upon itself so as to define said upper and lower net pieces.

20. A filter system as set forth in claim 10, wherein:
said peripheral portions of said upper and lower net pieces are welded to each other.

* * * * *